(12) United States Patent  
Fansler et al.

(10) Patent No.: US 7,902,115 B2
(45) Date of Patent: Mar. 8, 2011

(54) ADDUCTS OF AMINES AND POLYCARBOXYLIC ACIDS, AND FILTER MEDIA COMPRISING SUCH ADDUCTS

(75) Inventors: Duane D. Fansler, Dresser, WI (US); Allen R. Siedle, Lake Elmo, MN (US); Zhongshu Tan, Little Canada, MN (US); Thomas E. Wood, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 65 days.

(21) Appl. No.: 12/388,647

(22) Filed: Feb. 19, 2009

(65) Prior Publication Data

US 2009/0215618 A1    Aug. 27, 2009

Related U.S. Application Data

(60) Provisional application No. 61/030,304, filed on Feb. 21, 2008.

(51) Int. Cl.
*B01J 20/22* (2006.01)
*B01J 20/00* (2006.01)
*B01J 20/26* (2006.01)
*C01B 31/08* (2006.01)
*C07C 55/10* (2006.01)

(52) U.S. Cl. ......... 502/401; 502/400; 502/402; 502/416; 502/417; 562/590; 564/459; 564/512

(58) Field of Classification Search .................. 502/400, 502/401, 402, 416, 417; 588/300, 313, 315; 423/235, 236, 240 R, 372, 383, 384; 564/459, 564/512; 562/590; 252/183.11
See application file for complete search history.

(56) References Cited

U.S. PATENT DOCUMENTS

| | | | |
|---|---|---|---|
| 4,531,953 | A | 7/1985 | Groose et al. |
| 4,801,311 | A | 1/1989 | Tolles |
| 4,802,898 | A | 2/1989 | Tolles |
| 4,966,920 | A | 10/1990 | Gainer et al. |
| 5,063,196 | A | 11/1991 | Doughty et al. |
| 5,145,820 | A | 9/1992 | Liang et al. |
| 5,344,626 | A | 9/1994 | Abler |
| 5,462,908 | A | 10/1995 | Liang et al. |
| 6,344,071 | B1 | 2/2002 | Smith et al. |
| 2007/0207079 | A1* | 9/2007 | Brady et al. ............... 423/244.1 |
| 2008/0026041 | A1 | 1/2008 | Tepper et al. |

FOREIGN PATENT DOCUMENTS

WO    WO 2008/055126 A3    5/2008

OTHER PUBLICATIONS

PCT International Search Report PCT/ISA/210, (Aug. 26, 2009).

(Continued)

*Primary Examiner* — Timothy C Vanoy
*Assistant Examiner* — Daniel Berns
(74) *Attorney, Agent, or Firm* — Kenneth B. Wood (57) ABSTRACT

Herein are disclosed adducts of amines and polycarboxylic acids, and methods of making such adducts. Such adducts can be used to remove cyanogen chloride. Also disclosed are methods of providing such adducts on supports to form filter media. Also disclosed are methods of combining such filter media with catalysts and/or with porous polymeric webs to form filter systems.

12 Claims, 2 Drawing Sheets

OTHER PUBLICATIONS

Braga, Dario and Maini, Lucia; Solid-State versus Solution Preparation of Two Crystal Forms of [HN(CH$_2$CH$_2$)$_3$NH][OOC(CH$_2$)COOH]$_2$. Polymorphs or Hydrogen Bond Isomers?; Royal Society of Chemistry; 2004; p. 976-977.

Braga, Dario and Maini, Lucia, et al.; Mechanochemical Preparation of Hydrogen-Bonded Adducts Between the Diamine 1,4-Diazabicyclo[2.2.2]Octane and Dicarboxylic Acids of Variable Chain Length: An X-ray Diffraction and Solid-State NMR Study; Chem Eur. J.; 2003; p. 5538-5548;vol. 9; Wiley-VCH Verlag GmbH & Co. KGaA, Weinheim.

Gobetta, Roberto;Nevi, Carlo, et al.; H MAS, N CPMAS, and DFT Investigation of Hydrogen-Bonded Supramolecular Adducts between the Diamine 1,4-Diazabicyclo-[2.2.2]octane and Dicarboxylic Acids of Variable Chain Length; Chemistry of Materials; 2005; p. 1457-1466; vol. 17; published by American Chemical Society, Washington, DC.

Schroder, Von Hans; Zur Darstellung von Cyanchlorid; Z. anorg. Allg. Chem.;1958; p. 296-299; vol. 297.

Bowes, Katharine F.;Ferguson. George; et al.;Salts of Maleic and Fumaric Acids with Organic Polyamines: Comparison of Isomeric Acids as Building Blocks in Supramolecular Chemistry; Acta Cryst; 2003; p. 100-117; B59.

Farrell, Dorcas M. M.; Ferguson, George; et al.; Chiral Versus Racemic Building Blocks in Supramolecular Chemistry: Tartrate Salts of Organic Diamines; Acta-Cryst; 2002; p. 272-288; B58.

Farrell, Dorcas M. M.; Ferguson, George; et al.; Chiral Versus Racemic Building Blocks in Supramolecular Chemistry: Malate Salts of Organic Diamines; Acta-Cryst; 2002; p. 530-544; B58.

\* cited by examiner

ADDUCTS OF AMINES AND POLYCARBOXYLIC ACIDS, AND FILTER MEDIA COMPRISING SUCH ADDUCTS

CROSS-REFERENCE TO RELATED APPLICATION

This application claims the benefit of U.S. Provisional Patent Application No. 61/030,304, filed Feb. 21, 2008, the disclosure of which is incorporated by reference herein in its entirety.

BACKGROUND

Cyanogen chloride is an extremely toxic gas, so its removal from respirable air is highly desirable. Certain amines, for example, triethylenediamine, have been found to be capable of removing cyanogen chloride, and are often used in combination with (e.g., incorporated on) sorbent materials such as activated carbon, in applications such as respiratory protection.

Carbon monoxide is also toxic, so its removal from respirable airstreams is also highly desirable. Various materials and substances (e.g. the well-known Hopcalite catalyst, and certain metal catalysts, for example, gold), have been found to be capable of catalyzing the oxidation of carbon monoxide to carbon dioxide and have been proposed for various respiratory protection applications.

SUMMARY

Herein is disclosed an amine adduct and a method of making such an adduct. In one embodiment, the adduct is formed by combining triethylenediamine (henceforth abbreviated as TEDA) with a polycarboxylic acid. The inventors have found the surprising result that forming TEDA into such an adduct lowers the volatility of TEDA, thus reducing many of the undesirable side effects of TEDA (for example its odor, its tendency to irritate eyes and skin, its tendency to poison or reduce the effectiveness of certain catalysts, its tendency to reduce the effectiveness of certain filtration media, particularly so-called electret filter media, etc.), while preserving or even enhancing the ability of the TEDA to remove cyanogen chloride.

Also disclosed are methods of combining TEDA and polycarboxylic acids so as to form such adducts. Additionally disclosed are adduct compositions which have been found to be particularly useful. Further disclosed is the incorporation of adducts onto supports (e.g., high or extended surface area materials such as activated carbon and certain aluminas), so as to form filter media. Such filter media can be usefully employed in various types of respiratory protection products and systems.

Additionally disclosed are filter systems comprising adducts as described herein (in particular, adducts provided on supports) that are useful in the removal of, e.g., cyanogen chloride, in combination with catalysts that are useful in the removal of other materials, e.g., carbon monoxide. The inventors have found the surprising result that such adducts and such catalysts can be employed in the same filter system, without either one unacceptably reducing the performance of the other. In a particular embodiment, such catalysts comprise gold clusters of size about 0.5 nm to about 50 nm, which can be used to catalyze the oxidation of carbon monoxide to carbon dioxide. Such gold catalysts are known to be susceptible to poisoning (e.g., are known to have their catalytic activity inhibited) by amines. The inventors have found the surprising result that such gold catalysts and TEDA can be used in the same filter system, if the TEDA is present in the form of an adduct with a polycarboxylic acid.

Additionally disclosed are filter systems comprising adducts as described herein (in particular, adducts provided on supports) that are useful in the removal of, e.g., cyanogen chloride, in combination with filter media that are useful in the removal of particulates. In particular, such adducts are useful in combination with porous polymeric filtration media of the type generally referred to as electret webs. The inventors have found the surprisingly result that such adducts and electret webs can be employed in the same filter system, without either one unacceptably reducing the performance of the other.

Filter media containing TEDA/polycarboxylic acid adducts, filter systems containing such adducts in combination with gold catalysts, and/or filter systems containing such adducts in combination with electret webs, can be included in respiratory protection devices, as described in detail herein. Such respiratory protection devices can include devices for personal protection (that is, protection of a single individual), or for so-called collective protection (that is, devices that protect or treat the air to which multiple individuals are exposed). Such collective protection devices may be used in, e.g., vehicles, buildings, work environments (mines, factories, etc.), and the like.

Thus disclosed herein in one aspect is a filter medium, comprising a support and an adduct of triethylenediamine and a polycarboxylic acid provided on the support.

Disclosed herein in another aspect is a method of making a filter medium, comprising the steps of providing triethylenediamine and at least one polycarboxylic acid; combining the triethylenediamine with the polycarboxylic acid under conditions effective to form an adduct thereof; and, causing the adduct to be provided on a support.

Disclosed herein in another aspect is a method of removing cyanogen chloride from a gaseous stream, comprising the steps of providing a filter medium comprising a support with an adduct of triethylenediamine and a polycarboxylic acid provided on the support; and, exposing the gaseous stream to the filter medium.

Disclosed herein in yet another aspect is a filter system, comprising: a filter medium comprising a support comprising an adduct of triethylenediamine and a polycarboxylic acid; and, a catalyst active for the oxidation of carbon monoxide.

Disclosed herein in yet another aspect is a filter system, comprising: a filter medium comprising a support comprising an adduct of triethylenediamine and a polycarboxylic acid; and, a filter medium comprising a porous polymeric web.

Disclosed herein in still another aspect is an adduct of triethylenediamine and a polycarboxylic acid, wherein the adduct is selected from the group consisting of: a 1:1 stoichiometric adduct of triethylenediamine and succinic acid, wherein the adduct exhibits an X-ray diffraction pattern of 4.4 (100), 2.4 (14), 3.1 (12), and 4.1 Å (11); a 1:1 stoichiometric adduct of triethylenediamine and succinic acid, wherein the adduct exhibits an X-ray diffraction pattern of 3.9 (100), 5.0 (89), 4.3 (62), 5.6 (55), and 3.8 Å (51); a 1:1 stoichiometric adduct of triethylenediamine and malic acid, wherein the adduct exhibits an X-ray diffraction pattern of 6.2 (31), 5.5 (44), 4.8 (36), 4.6 (57), 3.9 (55), and 3.4 Å (100); a 1:1 stoichiometric adduct of triethylenediamine and tartaric acid; a 1:1 stoichiometric adduct of triethylenediamine and malonic acid; a 1:1 stoichiometric adduct of triethylenediamine and citric acid; and, a 1:1 stoichiometric adduct of triethylenediamine and glutamic acid.

Drawings and elements therein are not to scale unless noted. In the Figures, like reference numerals are used to designate like features throughout. Although terms such as "top", "bottom", "upper", "lower", "over", "under", "front", "back", and "first" and "second" may be used in this disclosure, it should be understood that those terms are used in their relative sense only.

DETAILED DESCRIPTION

Disclosed herein are adducts formed by combining an amine and a polycarboxylic acid. In various embodiments, the amine may be primary, secondary, or tertiary, and may be solid or liquid at room temperature (i.e., about 25° C.), at 1 atm. Preferred amines possess at least some ability to remove toxic gases such as cyanogen chloride and the like. In various embodiments, suitable amines may include triethylamine (TEA) or quinuclidine (QUIN); triethylenediamine (TEDA); pyridine, pyridine carboxylic acids such as pyridine-4-carboxylic acid (P4CA), combinations of these, and the like. In a presently preferred embodiment, the amine is triethylenediamine (commonly abbreviated as TEDA), also known as 1,4-diazabicyclo[2.2.2]octane (commonly abbreviated as DABCO).

The term polycarboxylic acid as used herein means an organic molecule that contains at least two carboxylic acid groups. Such molecules may be written in general form as R(COOH)x, where x is equal to or greater than 2, and where R can comprise a covalent bond (in the case of oxalic acid) or a hydrocarbon moiety (e.g., an alkyl, aromatic, alkenyl, etc., group). In one embodiment, the polycarboxylic acid comprises two carboxylic acid (COOH) groups. Thus, suitable polycarboxylic acids may include e.g. oxalic acid, malonic acid, succinic acid, glutaric acid, adipic acid, pimelic acid, suberic acid, azelaic acid, sebacic acid, maleic acid, fumaric acid, phthalic acid, isophthalic acid, terephthalic acid, and combinations thereof. In another embodiment, the polycarboxylic acid comprises three carboxylic acid groups. Suitable carboxylic acids of this type include e.g. citric acid. In still another embodiment, the polycarboxylic acid comprises four or more carboxylic acid groups. In a particular embodiment, the polycarboxylic acid is polymeric in nature. For example, the polycarboxylic acid can comprise a relatively long chain backbone with pendant carboxylic acid groups, as exemplified by poly(acrylic acid).

In a one embodiment, the polycarboxylic acid contains at least one hydroxyl group that is not part of a carboxylic acid group (that is, in addition to the hydroxyls present on the carboxylic acid groups). Such hydroxy polycarboxylic acids are of particular interest because of their moderate acidity and low toxicity, and can include polycarboxylic acids with two, three, or four or more carboxylic acid groups. For example, suitable hydroxy carboxylic acids may include e.g. malic acid, citric acid, and tartaric acid.

In various embodiments, the polycarboxylic acid can comprise other substituents or groups in addition to hydrocarbon moieties and the above-mentioned optional hydroxyl group(s). For example, the R group can comprise any suitable component or substituent (e.g. $NH_2$, as in the case of glutamic acid; HS, as in the case of thiomalic acid, etc.).

While not being limited by theory or mechanism, it is postulated that the Bronsted acidic nature of such polycarboxylic acids (i.e. their possession of one or more donatable protons) may be at least partly responsible for their ability to form suitable adducts with TEDA. In particular, their somewhat acidic (i.e., weakly acidic) nature may facilitate sufficient acid/base interaction between the polycarboxylic acid and the TEDA to form an adduct, without however being so acidic as to completely protonate the TEDA to form a salt, which might be disadvantageous. (For example, the inventors found that reaction of TEDA with HCL resulted in the formation of an onium salt (bis hydrochloride) of TEDA, which did not function well in removing cyanogen chloride). It is thus noted that although the polycarboxylic acids advantageously contain acidic, ionizable or donatable protons, complete proton transfer (i.e., salt formation) may not occur in the formation of the adducts.

A single polycarboxylic acid may be used, or multiple polycarboxylic acids (e.g., any of the above-mentioned polycarboxylic acids) may be used in combination. Other compounds, materials, etc. may be present for various purposes as long as they do not unacceptably reduce the ability of the polycarboxylic acid and TEDA to form an adduct, or unacceptably reduce the ability of the adduct to perform the functions described herein.

In one embodiment, the polycarboxylic acid is water soluble, which can render the adduct amenable to being produced by solution-based (e.g. water-based) methods as described later herein. In a specific embodiment, the polycarboxylic acid is water soluble to sufficient extent that when dissolved in water at a level of 0.2% by weight at 25° C., it forms a clear, isotropic liquid.

In one embodiment, the polycarboxylic acid is of relatively low molecular weight (e.g., less than 150 grams/mole, as exemplified by many of the acids listed above). In other embodiments, the polycarboxylic acid may comprise a higher molecular weight (e.g. greater than 150 grams/mole, greater than 200 grams/mole, or greater than 300 grams/mole). In further embodiments, the polycarboxylic acid may comprise a molecular weight of less than about 1000 grams/mole, less than 500 grams/mole, or less than about 300 grams/mole. The above-mentioned polymeric polycarboxylic acids may have relatively high molecular weight, e.g. greater than 1000 grams/mole. If it is desired that the polycarboxylic acid be water soluble (e.g., to aid in solution-based processing), the molecular weight of the polymeric polycarboxylic acid can be selected for optimum water solubility.

The herein-disclosed adducts of TEDA and various polycarboxylic acids can also be described as complexes, and are reproducibly manufacturable according to methods taught by herein, and exhibit reproducible properties as disclosed herein. The inventors have found such adducts to be useful in reducing the disadvantages and side effects of TEDA, while preserving and potentially even enhancing the ability of the TEDA to remove cyanogen chloride.

In particular, forming TEDA into an adduct can serve to reduce the volatility of TEDA in comparison to that of free (uncomplexed) TEDA. Due to the properties of TEDA (odor, ability to irritate skin and eyes, ability to poison certain catalysts, ability to cause discoloration of certain polymeric materials, etc.), such a reduction in volatility is quite useful.

The inventors have also found that the adducts described herein can comprise unexpectedly high thermal stability. For example, some adducts have been observed to survive extended periods of exposure to elevated temperature (for example, being dried under vacuum at 60° C.) without significant weight loss. Thermogravimetric testing (e.g., determination of the amount and/or rate of weight loss that occurs on heating to various temperatures) has revealed some adducts to exhibit unimodal weight loss-versus-temperature curves. This indicates that upon heating, a TEDA-containing adduct may be volatilized, at elevated temperatures, rather than the adduct dissociating to release/volatilize (free) TEDA at lower temperatures. Such a result may be unexpected in view of the fact that many such amine-containing materials (e.g. onium salts, such as ammonium chloride) are commonly known to dissociate on heating such that the constituents are volatilized separately.

Thermogravimetric testing has also revealed (see Table 1 of the Examples section) that some adducts comprise a $T_{max}$ (temperature of maximum rate of weight loss upon heating) that is near, and in some cases even higher than, the relatively higher $T_{max}$ of the polycarboxylic acid constituent, rather than being near the relatively lower (expected) $T_{max}$ of the TEDA constituent (TEDA being so volatile that a $T_{max}$ would be difficult to measure). Such a finding ($T_{max}$ of the adduct being near to or higher than that of the highest-$T_{max}$ parent constituent) is unexpected.

In addition, the inventors have discovered that TEDA in the form of the herein-described adducts can comprise preserved or even enhanced ability to remove cyanogen chloride. (For example, it has been found that certain TEDA/adducts can exhibit a longer CK Service Life, as described herein, than exhibited by TEDA when not in the form of an adduct). The surprising discovery has been made that TEDA can be formed into an adduct in which the volatility is reduced, but in which the TEDA is still accessible by the cyanogen chloride, able to interact with the cyanogen chloride, and able to remove the cyanogen chloride, e.g., from a gaseous stream.

Adducts of TEDA with various polycarboxylic acids are disclosed herein. In a particular embodiment, the adduct comprises about a 1:1 stoichiometric ratio between the TEDA molecules and the polycarboxylic acid molecules. (Such a stoichiometric ratio, however, does not imply that any sort of specific chemical reaction, so as to form a specific chemical bond, occurs in the formation of the adduct).

At least some of the adducts disclosed herein appear to be polymorphs (polymorphism being defined herein as the property of some molecular complexes to assume more than one form, e.g. more than one crystalline form, in the solid state). The structure of such polymorphs can be sensitive to the method of production and different polymorphs from the same parent constituents can have distinctly different properties. Such polymorphs are often characterized by methods such as X-Ray Diffraction, Infrared Absorption, Differential Scanning Calorimetry, and the like. For example, different polymorphs typically exhibit diffraction patterns (i.e., different sets of peaks (intensities) found at different two-theta (scattering) angles.

Adducts as disclosed herein may comprise one or more water molecules (e.g., waters of hydration). The presence or absence of water in the adduct may be dependent on the method of preparation. Thus in some cases the adduct may comprise one or more waters of hydration as prepared. (For example, with reference to the TEDA-succinic acid adduct of Example 2 discussed later herein, the Infrared Spectroscopy peaks at 3561 cm–1 and 3476 cm–1 appear to be $\upsilon_{OH}$ bands and the peak at 1642 cm–1 appears to be a $\delta_{OH}$ band, all of which are indicative of water of hydration). Even if prepared so as to be initially lacking water, in some cases adducts may acquire water during storage and/or use (e.g., the adduct may acquire water upon exposure to humid air). For example, some adducts appear to be able to reversibly acquire water (e.g., when exposed to water-saturated air or nitrogen). In some cases mixtures of hydrated and anhydrous adducts may be found.

Under suitably controlled conditions, TEDA and a suitable polycarboxylic acid can be brought together so as to combine to form an adduct. This does not necessarily imply the formation of a defined chemical bond (e.g., a covalent bond, an ionic bond, etc.) between the TEDA and the acid. Nor does it necessarily imply the formation of a product with a specific molecular structure. Rather, as discussed above, the adduct product of combining the TEDA and the polycarboxylic acid may be described as a complex or polymorph.

Various methods of making such adducts are disclosed herein. Such methods include any procedure in which TEDA and one or more polycarboxylic acids are brought together and combined to form an adduct. For example, TEDA may be deposited onto a support, after which a polycarboxylic acid is deposited onto a support under conditions such that an adduct can form. Or, the polycarboxylic acid may be first deposited, after which TEDA is deposited under conditions such that an adduct can form. Such deposition may occur by any known method including, e.g., vapor deposition, sublimation, impregnation, etc., as long as conditions are controlled such that adduct formation occurs.

In various embodiments, processes can be used in which the TEDA and the acid are brought into contact under conditions optimum for the formation of such adducts. For example, the TEDA can be provided in an environment in which there are little or no other entities (e.g. molecules, atoms, colloids, micelles, etc.) present that can react with the TEDA, form a complex with it, cluster around it, or otherwise chemically interact with, or physically block, the TEDA in such a manner as to prevent it from combining with the acid to form the adduct. In particular, it may be advantageous to provide the TEDA in a maximally accessible condition (for example, not condensed on a solid material such as a support) in order to form the adduct. Likewise it may be advantageous to provide the polycarboxylic acid in a similarly accessible condition. Thus, in one embodiment a method of combining TEDA and a polycarboxylic acid is disclosed in which the TEDA and the acid are physically mixed and ground together.

An alternative embodiment comprises a method in which the TEDA and the polycarboxylic acid are placed (e.g. suspended, dissolved, etc.) into a common mixture (e.g., a solution in a suitable solvent or solvent mixture, such as water, alcohol, a water-alcohol mixture, etc.) after which a portion or essentially all of the solvent is removed. The inventors have found such a process to be particularly useful in formation of adducts. In various embodiments the TEDA and the polycarboxylic acid may form an adduct in the initial solution (which adduct is recovered upon solvent removal, filtration, etc.); or, the TEDA and the polycarboxylic acid may form an adduct during the late or final stages of solvent removal, e.g. concurrently with a drying, precipitation, and/or crystallization process. Also, in various embodiments the TEDA and/or the polycarboxylic acid may be solubilized in the common mixture so as to form a stable solution; or, one or the other may be present in the form of a metastable solution; or, one or the other may be present in the form of a suspension. (In some cases one component may comprise a suspension prior to the addition of the other component, which addition may result in the first component being better able to be solubilized such that a solution is formed). Any such circumstance is encompassed within the methods disclosed herein, as long as a suitable adduct product can be reproducibly obtained from the process.

In various embodiments, herein are disclosed methods of making adducts in which the TEDA and the polycarboxylic acid are brought together in amounts that are in the range suited to form 1:1 adducts (for example, bringing TEDA and an acid together in a stoichiometric (molecular) ratio ranging from about 1.1:1 TEDA/acid to about 1.1:1 acid/TEDA). In a particular embodiment, a slight excess of acid can be used in order to provide that little or no free TEDA (that is, TEDA that is not in the form of an adduct with the acid) is present after the materials are combined. Such an arrangement can minimize the adverse effects (volatility, etc.) of free TEDA as mentioned previously. In an additional embodiment, the production process can include the removal of free TEDA after the materials are combined. Such a process can include for example heating, which can be performed either before or after the adduct is deposited onto a support.

In the case of a polymeric (e.g., high molecular weight) polycarboxylic acid, a 1:1 molecular ratio of the acid molecule(s) and the TEDA molecule(s) may not exist in the manner that would be obtained when using a small-molecule polycarboxylic acid. That is, carboxylic acid groups on various portions of the polymer backbone may interact with different TEDA molecules, thus a 1:1 ratio of TEDA molecules to polycarboxylic acid molecules may not be present. In such a case, the adduct may not comprise 1:1 stoichiometric adduct. Nevertheless, such a TEDA/polymeric polycarboxylic acid combination product is within the scope of the concept of an adduct as contemplated by the inventors.

In one embodiment, TEDA and a polycarboxylic acid are provided on a support so as to form a filter medium (e.g., an air-permeable structure, assembly, matrix, collection of particles, etc., that is designed to remove contaminants from air that passes through it).

The support may be selected from a wide variety of substrates. The support may have a convoluted, textured and/or porous surface and in various embodiments is capable of being incorporated with at least about 0.1%, at least about 1.5%, or at least about 3%, by weight of one or more impregnants including the adduct.

The support may have many forms. Representative examples of such forms include woven or nonwoven fabric; bonded, fused, or sintered block; particles, granules, or pellets; filtration media arrays, etc. In one embodiment, the support comprises particles with a relatively high surface area. In various embodiments, such particles comprise a (BET) specific surface area (as can be determined by the procedure described in ISO 9277:1995) of at least about 85 m$^2$/g, at least about 300 m$^2$/g, or at least about 900 m$^2$/g. In additional embodiments, such particles have BET specific surface areas of at most about 2000 m$^2$/g, or at most about 1500 m$^2$/g.

The support may comprise porosity. In one embodiment, the support comprises a porosity (that is, the volume ratio of pore space to the total volume of the support medium) greater than about 0.4. Such porosities can be observed and measured, for example via transmission electron microscopy (TEM).

In a specific embodiment, the support comprises nanoporosity (that is, it comprises a porosity greater than about 0.4 and an average pore diameter, as characterized by TEM, ranging from about 1 nm to about 100 nm in size).

In a particular embodiment, the support media comprises a total Nanoporous Capacity for pores in the size range of 1 to 10 nm that is greater than about 20 percent (that is, greater than about 0.20 using the formula below) of its total volume of pores in the size range of 1 to 100 nm, as calculated using the following formula:

$$NPC = \frac{CPv_1 - CPv_{10}}{CPv_1 - CPv_{100}}$$

wherein NPC refers to the Nanoporous Capacity of the support medium; $CPv_n$ refers to the cumulative pore volume at pore radius n in cubic centimeters per gram (cm$^3$/g); and n is the pore radius in nanometers.

In a specific embodiment, the Nanoporous Capacity is calculated using data obtained by TEM. In an alternative embodiment, the data used is obtained by use of nitrogen desorption isotherms according to the technique described in ASTM Standard Practice D4641-94.

The support may be made of various materials. Representative examples of such materials include paper, wood, polymers and other synthetic materials, carbonaceous materials, silicaceous materials (such as silica), metals, metal compounds, and combinations thereof. Representative examples of suitable metal compounds include oxides, sulfides, nitrides, or like compounds of magnesium, aluminum, titanium, vanadium, chromium, manganese, cobalt, nickel, copper, zinc, gallium, germanium, strontium, yttrium, zirconium, niobium, molybdenum, ruthenium, rhodium, palladium, silver, cadmium, indium, iron, tin, antimony, barium, lanthanum, hafnium, tungsten, rhenium, osmium, iridium, platinum, and combinations thereof. Representative examples of suitable carbonaceous materials include activated carbon and graphite. Suitable activated carbon may be derived from a wide variety of sources including coal, coconut, peat, and combinations thereof.

In one embodiment, the activated carbon comprises that class of materials known as whetlerites, which can be generally described as activated carbons that contain certain metals, or oxides of metals, such as copper, molybdenum, silver, vanadium, zinc, and so on. In a further embodiment, the activated carbon comprises those materials generally described in U.S. Pat. No. 5,344,626, herein incorporated by reference in its entirety. In a particular embodiment, the activated carbon comprises a first metal salt wherein the metal is in group 6-12 of the periodic table; and, a second metal salt that comprises a metal carbonate salt, wherein the metal is in group 1 of the periodic table.

In a particular embodiment the support comprises a guest/host structure. Such a support can be made by providing (e.g., depositing, adsorbing, growing, or adhering) relatively smaller guest particles on relatively larger host particles (such as larger particles, powders, pellets, granules, and combinations thereof), or on relatively larger nonparticulate host material (such as woven and nonwoven media, membranes, plates, filtration media arrays, and combinations thereof). Such a guest/host structure can provide higher total exterior surface area while retaining the desirable gas flow characteristics, e.g., low pressure drop, of a larger particle. In such a case, the adduct can be positioned on the guest, the host, or both.

Either the guest and/or the host can comprise porosity or nanoporosity, as herein defined. The guest and the host can be made of various support materials as described herein. In a specific embodiment, the guest material comprises titania, and the host material comprises activated carbon.

A variety of methods generally may be used to construct a guest/host support. In one embodiment, smaller guest particles are admixed with one or more adhesion agents in solution and then this mixture is combined with larger host particles. In another embodiment, guest-host composites are prepared by physically mixing guest and host materials.

In one embodiment, an adduct is formed after which the formed adduct is incorporated onto/into a support (with certain supports, e.g. porous materials, such an into/onto distinction may be difficult to characterize; either term is intended to broadly encompass any process in which an adduct is placed in contact with the interior and/or exterior surface of a support). For example, adduct pre-formed by the previously-described mixing/grinding process can be deposited onto a support. In another embodiment, the adduct is formed in situ on the support. For example, TEDA can be incorporated (e.g. deposited, impregnated, condensed, etc.) onto a support after which polycarboxylic acid is added to form the adduct. Or, polycarboxylic acid can be incorporated onto the support after which TEDA is added to form the adduct.

In another embodiment, a mixture (e.g. a solution, a metastable solution, a suspension, etc.), obtained for example by the previously-described process of dissolving the TEDA and the polycarboxylic acid in a common solvent, is incorporated (e.g. deposited, impregnated, coated, sprinkled, misted etc.) onto a support, after which some or all of the solvent(s) is removed (e.g. evaporated). Such an embodiment may possess particular advantages in allowing large-scale processing in the production of filter media.

In various embodiments, appropriate amounts of TEDA and polycarboxylic acid may be chosen, and/or processing conditions may be chosen, so that an adduct with about a 1:1 TEDA/polycarboxylic acid stoichiometric ratio is obtained. In particular, the mixing/grinding method and the common-solution method can allow selection of the TEDA/polycarboxylic acid stoichiometric ratio, and can allow the components to be combined in such a way, as to promote the formation of an adduct with about a 1:1 stoichiometric ratio of TEDA/polycarboxylic acid. This may be advantageous in minimizing the need for removal of an excess of either component (particularly the TEDA, in view of the already-mentioned problems associated with free TEDA). However, such a removal procedure can be carried out if desired. For example, the support can be heated so as to volatilize the free TEDA.

In a particular embodiment, so-called incipient wetness impregnation methods are used to deposit the adduct on the support. In such methods, an aqueous mixture containing the adduct or the adduct precursor constituents (e.g., a solution, suspension, etc. of the adduct in water, or a solution, suspension, etc. of the adduct precursors, etc.) is provided. As discussed earlier, the aqueous mixture may comprise other ingredients (e.g. a cosolvent or cosolvents of various types), as desired. The aqueous mixture is gradually added to the support with constant stirring. This is continued until the support appears to be saturated with the aqueous mixture. (Typically, the support is dry initially so that the point of saturation of the support is more readily observed). The wetted support is then dried at a suitable temperature for a suitable time period. By way of example, drying the impregnated support at a temperature in the range of about 50° C. to about 250° C., preferably about 80° C. to about 180° C., for a time period in the range of about 30 minutes to about 10 hours, would be suitable. The impregnated support is then cooled. Optionally, the impregnation, drying, and cooling may be repeated one or more times to impregnate additional amounts of the amine adduct onto and into the support. The drying period and temperature may be extended, if desired, to help ensure that any free TEDA (i.e., TEDA that is not part of an adduct) is driven off. Any free TEDA that is driven off can be recovered and then recycled or discarded as desired.

If other materials are desired to be impregnated into/onto the support using impregnation techniques, the adduct may be impregnated into/onto the support before, during, and/or after impregnation of the other impregnants. In the particular embodiment in which one or more other co-impregnants are to be impregnated into/onto the support by other, non-wet impregnation techniques such as sublimation, physical vapor deposition, chemical vapor deposition, or the like, wet impregnation of the adduct may occur before or after the other, non-wet impregnation step.

The amount of adduct incorporated into/onto the support may vary over a wide range. In general, if too little is used, the Cyanogen Chloride Service Life of the filter media, as measured in the test disclosed later herein, may be shorter than desired. On the other hand, using too much adduct may tend to reduce the capacity of the filter media to remove other contaminants (e.g., organic vapors, acid gases, etc.). In view of these considerations, in various embodiments the adduct can be introduced into/onto the support at levels corresponding to at least about 0.1 parts by weight of TEDA, at least about 0.5 parts by weight of TEDA, or at least about 3.0 parts by weight of TEDA, all relative to 100 parts by weight of the support. In additional embodiments, the adduct can be introduced into/onto the support at levels corresponding to at most about 25 parts by weight of TEDA, at most about 10 parts by weight of TEDA, or at most about 6 parts by weight of TEDA, all relative to 100 parts by weight of the support.

Herein is also disclosed a filter system which comprises one or more catalysts in addition to comprising a filter medium that comprises a TEDA/polycarboxylic acid adduct. In various embodiments, such catalysts may be positioned on the same support as the TEDA/polycarboxylic acid adduct, or on a separate support. Such a separate support may be intermingled with the support comprising the TEDA/polycarboxylic acid adduct (as in the embodiment of FIG. 1, discussed later in detail herein), or may be in a separate location (e.g. in a separate layer in a cartridge, in a separate cartridge, etc.) from the support comprising the TEDA/polycarboxylic acid adduct. For example, if the performance of the particular catalyst used is somehow sensitive to the presence of the TEDA/polycarboxylic acid adduct, the catalyst may be placed in the filter system such that the catalyst is upstream from the adduct (in this context, upstream means that in operation of the filter system, a gaseous stream flowing through the filter system would encounter the catalyst prior to encountering the TEDA/polycarboxylic acid adduct). Conversely, if the performance of the adduct is somehow sensitive to the presence of the catalyst, the TEDA/polycarboxylic acid adduct may be placed in the filter system upstream from the catalyst.

In various embodiments, catalysts that may be useful in such filter systems include metal catalysts such as platinum, silver, nickel, palladium, rhodium, ruthenium, osmium, copper, iridium, and combinations thereof. In a particular embodiment, catalytically active gold (e.g., elemental gold) is used, either alone or in combination with one or more of the other metal catalysts listed above. In this context, catalytically active gold signifies gold of cluster size of about 0.5 nm to about 50 nm, that is active to, for example, oxidize carbon monoxide to carbon dioxide. Such gold catalysts are known to those of skill in the art to be sensitive to amines (such as TEDA); i.e. amines are known to tend to poison or inhibit the catalytic activity of gold in reactions such as CO oxidation. However, the inventors have surprisingly found that when the TEDA is formed into an adduct with a polycarboxylic acid, catalytically active gold appears to be less sensitive to the presence of the amine. The inventor's discoveries thus allow the use of filter systems that comprise the dual functionality of TEDA to remove cyanogen chloride, and catalytically active gold to oxidize CO.

Catalytically active gold can be deposited in a variety of methods including so-called wet methods (including solution-deposition and the like), and chemical vapor deposition, and can be deposited onto any suitable substrate as desired. In various particular embodiments, the gold can be deposited by physical vapor deposition, and/or can be deposited onto supports that have particular properties of composition, size or porosity, or that comprise guest/host structures, or that include various promotor materials, or that comprise other properties and attributes, all as described in detail in US Patent Publication 2005/0095189, which is incorporated by reference herein in its entirety.

Herein is also disclosed a filter system which comprises a porous polymeric web based filter medium in addition to comprising a filter medium that comprises a TEDA/polycarboxylic acid adduct. Such a porous polymeric web, which can comprise a woven web, a nonwoven web (often comprised of so-called blown microfibers of a material such as a polyolefinic material), an open-cell foam material, and the like, is often used for filtration of particulates.

In one embodiment, the porous polymeric web comprises a so-called electret web, i.e., a web that comprises a dielectric material that exhibits at least a quasi-permanent electric charge. Such charged webs have been known since, for example, Kubik et al. described (in U.S. Pat. No. 4,215,682) a method for introducing a persistent electric charge into meltblown fibers during fiber formation. In various embodiments, such electret webs may comprise fluorinated materials, as achieved for example by methods such as plasma fluorination (e.g., as described in U.S. Pat. No. 6,409,806), or by incorporation of fluorochemical melt additives (e.g. as described in U.S. Pat. No. 5,025,052). In various additional embodiments, such webs may comprise hydrocharged materials (that is, webs in which an electric charge is imparted by exposing the web to a stream of water) as described in U.S. Pat. No. 5,496,507.

Electret webs are known to those of skill in the art to be sensitive to amines (such as TEDA); i.e. amines are known to tend to reduce the efficiency of electret webs. However, the inventors have surprisingly found that when the TEDA is formed into an adduct with a polycarboxylic acid, such electret webs appear to be less sensitive to the presence of the amine. The inventor's discoveries thus allow the use of filter systems that comprise the dual functionality of TEDA to remove cyanogen chloride, and electret webs that provide excellent removal of particulates.

A filter system may be produced containing both a TEDA/polycarboxylic acid adduct (typically on a support) and a porous polymeric web, in any number of ways. In one embodiment, the TEDA/polycarboxylic acid adduct may be deposited or otherwise placed or incorporated into/onto the porous polymeric web (i.e., the porous polymeric web may function as the support for the TEDA/polycarboxylic acid adduct, in a configuration described previously herein). In another embodiment, the adduct can be provided on a support (e.g., activated carbon), which is then deposited, embedded, intermingled, etc., into/onto the porous polymeric web. In still another embodiment, the porous polymeric web and the TEDA/polycarboxylic acid adduct may be present at separate locations in the filter system (e.g., as separate layers in a cartridge, in separate cartridges, etc.). For example, such porous polymeric webs are often positioned in filtration systems as an upstream layer, with additional filter media (e.g., activated carbon) present downstream from the porous polymeric web layer (in this context, upstream means that in operation of the filter system, a gaseous stream flowing through the filter system would encounter the porous polymeric web layer prior to encountering the TEDA/polycarboxylic acid adduct). Such a configuration is shown in an exemplary manner in FIG. 3, described later herein.

In summary, a porous polymeric web, present in a filter system in any of the above-described configurations, may comprise an electret material. The porous polymeric web may be flat, pleated, folded, supported by a reinforcing structure, etc., all according to methods known in the art. Additionally, filter systems as described herein may include TEDA/polycarboxylic acid adducts in combination with both the above-described gold catalysts and the above-described porous polymeric webs (including electret webs).

Filter media or filter systems as disclosed herein may also comprise a suitable filtering agent. Such a filtering agent can be provided on the support comprising the adduct, the support comprising the catalyst (if one is used), or elsewhere in the filter system. The term filtering agent generally refers to any ingredient that may help to filter one or more undesired gases from an air stream. In various embodiments, suitable filtering agents include metals, metal alloys, intermetallic compositions, compounds containing one or more of copper, zinc, molybdenum, silver, nickel, vanadium, tungsten, yttrium, cobalt, and combinations thereof. For example, Cu may help to filter HCN, $H_2S$, and acid gases; Zn may help to filter HCN, cyanogen chloride, cyanogen, and $NH_3$; Ag may help to filter arsenical gases; and Ni and Co each independently may help to filter HCN.

Such filter media (which may be the filter medium that comprises the adduct, or the filter medium that comprises the catalyst) may be incorporated, with about 0.1 to about 20 weight percent of filtering agent(s) based upon the total weight of the filtering agent(s) and the filter medium. The filtering agent(s) typically are provided as salts, oxides, carbonates, or the like and are incorporated via solution processing, sublimation processing, fluidized bed processing, or the like.

Water may or may not be a desired impregnant for any of the various filter media that are present in the filter system. For instance, if a metal catalyst, particularly catalytically active gold, is included, moisture can impair the activity of the catalyst upon storage for long periods of time. Consequently, it may be desirable to minimize the amount of water that is present in the filter system if a metal catalyst (e.g., catalytically active gold) is included. Thus, in various embodiments a filter system may comprise a filter medium that includes less than about 2 parts by weight, or less than about 1 part by weight, of water per 100 parts by weight of the filter medium.

However, moisture may beneficially help to remove acid gases from an air stream. Consequently, (particularly if metal catalysts are not included), in various embodiments the filter media may include at least about 2 parts by weight, up to about 15 parts by weight, or up to about 12 parts by weight, of water per 100 parts by weight of the filter medium.

Filter media and/or filter systems as described herein are suitable for application in respiratory protection to remove a broad range of toxic gases and vapors as found in industrial environments and also chemicals used as chemical warfare agents. The filter systems may achieve performance levels mandated both by applicable industrial filter approval specifications and by internationally recognized military filter performance specifications. In specific embodiments, the adducts and/or catalysts disclosed herein are used with activated carbon supports, in order to improve the ability of the activated carbon to remove, e.g., low boiling point toxic gases. In specific applications, these filter media and/or filter systems are used to filter breathing air in connection with personal and/or collective (e.g., building or motor vehicle) respiratory protective devices. Respiratory protection devices include devices or equipment for providing clean or cleansed air or oxygen as breathing air to a user or users. Such devices may include for example full face respirators, half mask respirators, supplied air hoods, powered air purifying respirators (PAPRs), etc. The broad capabilities of the filter media and/or filter systems disclosed herein render them suitable for a wide variety of applications, including being fitted onto a facemask, or being fitted singly or in multiples onto a powered air purifying respirator system. One such powered system is commercially available under the trademark "BREATHE-EASY" from 3M Company. However, the utility of the present invention is not limited to respiratory protective equipment, but also can be used for purifying air or other gases in connection with industrial processes.

Figure 1:
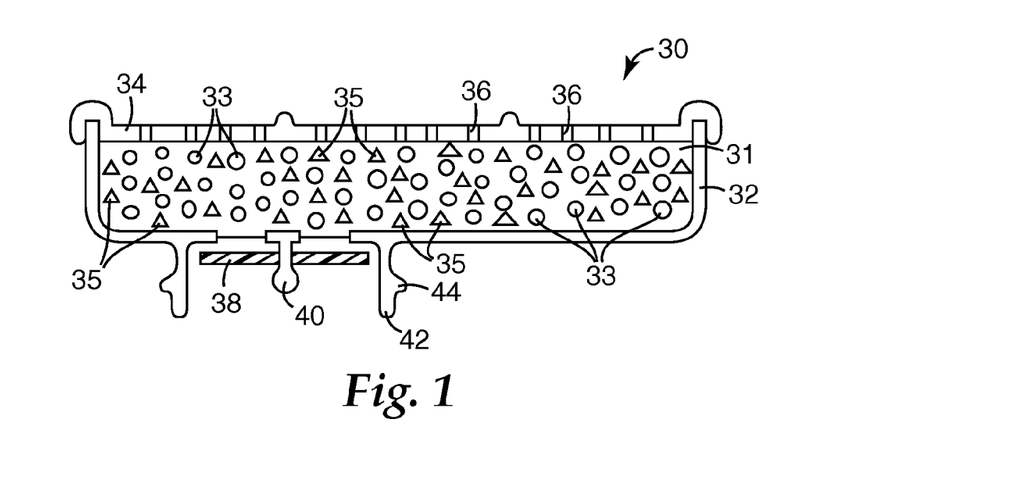
FIG. 1 is a schematic view in cross-section, of an exemplary filter system.
Figure 2:
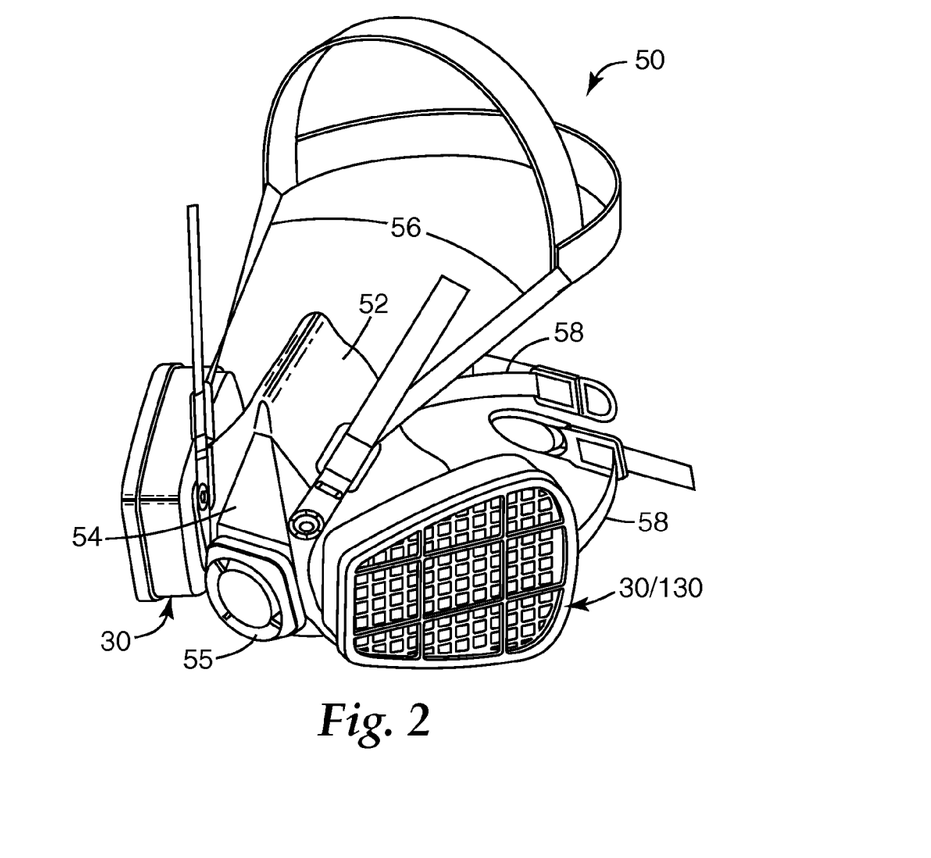
FIG. 2 is a perspective view of an exemplary respiratory device for personal protection.
Figure 3:
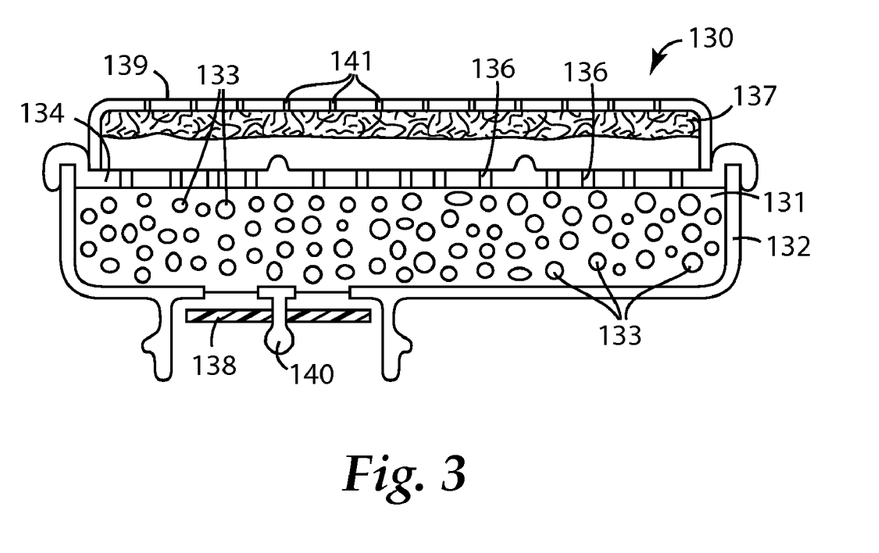
FIG. 3 is a schematic view in cross section, of another exemplary filter system.

FIGS. 1, 2, and 3 show various exemplary manners in which the compositions, methods and/or devices disclosed herein may be incorporated into personal protection devices. Firstly, FIG. 1 schematically shows a view in cross-section of an exemplary filter system 30. Filter system 30 includes interior space 31 that can be filled with filter media 33 containing an adduct as described herein (filter media 33 can, for example, comprise activated carbon particles, granules, etc., that comprise TEDA/polycarboxylic acid adduct, as described previously herein).

Interior 31 optionally may further include one or more additional filter media 35. For example, additional filter media 35 can include a CO oxidation catalyst in the form of catalytically active gold deposited onto titania guest particles and further supported upon carbonaceous host particles, as described in US Patent Publication 2007/027079. As has been described in detail herein, such a configuration is made possible by the fact that the TEDA/polycarboxylic acid adduct on filter media 33 can co-exist in the same filter system with filter media 35 containing the CO oxidation catalyst without undue poisoning of the CO oxidation catalyst.

Filter media 33 and optional filter media 35 are shown as being intermingled in the same filter bed in interior 31 in the exemplary embodiment pictured in FIG. 1. A wide variety of other deployment strategies also may be used. As one alternative, filter media 33 and filter media 35 may be provided in separate filter beds within interior 31 so that the incoming air passes first through one of the beds and then the other. Either filter media 33 comprising the adduct, or filter media 35 comprising a catalyst, can be placed upstream, according to the discussions previously presented herein.

The relative amounts of the filter media 33 and filter media 35 used in interior 31 may vary over a wide range. By way of example, the weight ratio of filter media 33 to filter media 35 may be at least about 1:50, at least about 1:20, or at least about 1:5. In additional embodiments, the weight ratio of filter media 33 to filter media 35 may be at most about 50:1, at most about 20:1, or at most about 5:1.

Referring still to exemplary filter system 30 of FIG. 1, housing 32 and perforated cover 34 surround filter media 33 and filter media 35. In use of the system, air (or any gaseous stream to be filtered) enters through openings 36 and comes into contact with filter media 33 and filter media 35, whereupon at least some portion of potentially hazardous substances (if present in the air) are absorbed, caused to react, or otherwise treated or removed from the air, by filter media 33 and filter media 35). The air then exits via valve 38 mounted on support 40.

Spigot 42 and bayonet flange 44 enable filter system 30 to be replaceably attached to a respiratory protection device such as the illustrative exemplary respiratory device 50 shown in FIG. 2. Device 50 is a so-called half mask similar those described in U.S. Pat. No. 5,062,421 and US Patent Publication 2006/0096911. Device 50 includes a soft, compliant facepiece 52 that can be insert-molded around a relatively thin, rigid structural member or insert 54. Insert 54 includes exhalation valve 55 and recessed, bayonet-threaded openings (not shown) for removably attaching elements 30 in the cheek regions of device 50. Adjustable headband 56 and neck straps 58 permit device 50 to be securely worn over the nose and mouth of the wearer.

FIG. 3 schematically shows a view in cross-section of another exemplary filter system 130. Filter system 130 includes housing 132 defining interior space 131 that contains filter media 133 containing an adduct as described herein (interior space 131 can optionally also contain additional filter media, as described above). Filter system 130 further comprises porous polymeric filtration layer 137 that is positioned upstream of filter media 133. In the particular configuration exemplified in FIG. 3, the porous polymeric filtration layer 137 is positioned outward of perforated divider 134. Such a configuration can be achieved, for example, by supplying layer 137 in a cap 139 (which comprises openings 141 to allow air flow) which can be snapped or otherwise fastened or attached to filter system 130. Such an exemplary configuration is shown in FIG. 3.

In use of the system, ambient air enters filter system 130 through openings 141 and passes through porous polymeric filtration layer 137, whereupon at least some portion of particles (if present in the air) are removed from the air. The air then passes through openings 136 and comes in contact with filter media 133, whereupon at least some portion of potentially hazardous substances (if present in the air) are absorbed, caused to react, or otherwise treated or removed from the air, by filter media 133. The air then exits via valve 138 mounted on support 140.

The filter system of FIG. 3 can be incorporated into a personal respiratory protection device similar to that of FIG. 2, in similar manner as described earlier.

EXAMPLES

The disclosures found herein will be further described with regard to the following detailed examples. These examples are offered to further illustrate the various specific and preferred embodiments and techniques. It should be understood, however, that many variations and modifications may be made while remaining within the scope of the present invention.

Adduct Compositions and Properties

In the following examples, chemical reagents were obtained from Sigma-Aldrich, St. Louis, Mo., unless otherwise stated.

Characterization by X-Ray Diffraction Analysis was performed using methods and apparatus well known to those of skill in the art. Specifically, XRD was performed by collecting reflection geometry data in the form of a ($\theta/2\theta$) survey scan by use of a Philips (PANalytical, Westborough, Mass.) vertical diffractometer, copper $K_\alpha$ radiation, and proportional detector registry of the scattered radiation. The diffractometer was fitted with variable incident beam slits, fixed diffracted beam slits, and a graphite diffracted beam monochromator.

The sample was mulled in an agate mortar and applied as a dry powder to a zero background specimen holder composed of single crystal quartz. The survey scan was conducted from 3 to 55 degrees (2θ) using a 0.04-degree step size and 6-second dwell time. X-ray generator settings of 45 kV and 35 mA were employed. Analysis of resulting powder diffraction data was accomplished by use of Jade (version 7.5, Materials Data Inc., Livermore, Calif.) diffraction software suite. All two-theta peaks were converted to unit cell interplanar spacings in Angstroms as calculated according to Braggs law, and are reported as such. In all cases, the interplanar spacing corresponding to the peak of highest intensity is reported as the (100) datum, with all other spacings normalized to that. For example, an interplanar spacing peak at 4.5 Å that had 14% relative intensity compared to the 100% peak would be reported as 4.5 (14).

Characterization by Infrared (IR) Spectrometry was carried out by use of standard methods and apparatus well known to those of skill in the art. Spectra were determined on Nujol mulls; only characteristic bands are reported. Nuclear Magnetic Resonance (NMR) Spectroscopy was likewise carried out by use of standard methods and apparatus well known to those of skill in the art. Differential Scanning Calorimetric (DSC) analysis and Thermogravimetric Analysis (TGA) were performed according to methods well known to those of skill in the art, using TA Instruments MDSC 2920 and TGA 2950, respectively. The DSC instrument was calibrated using indium and tin standards. The temperature calibration on the TGA instrument was performed using nickel and alumel standards. A nominal heating rate of 10° C./minute was used for DSC analysis and a heating rate of 50° C./minute was used for TGA analysis. Nitrogen purge at 50 mL/minute was applied for both DSC and TGA.

Uncertainties (e.g., plus or minus values) are not reported individually for the various numerical values, parameters and results in the examples below. However, all such numbers will be understood by those of skill in the art of XRD, IR, NMR, DSC, TGA, etc., as having the precision corresponding to typical analyses performed using such methods. That is, some variation in these values will be expected, depending on sample preparation and experimental technique, and on the precision of the measuring equipment used.

Example 1

TEDA-succinic Acid

A solution of TEDA (11.8 g, 0.1 mole) in 50 mL water was prepared. 5.9 g (0.05 mole) succinic acid was stirred into 50 mL water, which provided a hazy appearing suspension or solution. The TEDA solution and the succinic acid solution were combined and stirred, at which point a clear, colorless solution was obtained. Water was removed at 50° C. under reduced pressure during which process a solid product precipitated from solution. The solid was kept under dynamic vacuum for 16 hrs, after which the final solid product weighed 11.2 g.

Elemental analysis revealed the following elements to be present at the weight percentages reported below. Also presented (in parentheses) are the calculated weight percentages that correspond to a chemical formula of $C_{10}H_{18}N_2O_4$, which would represent a 1:1 stoichiometric ratio of TEDA ($C_6H_{12}N_2$) and succinic acid ($C_4H_6O_4$). (Experimentally-found versus 1:1 stoichiometric ratio-calculated weight percentages are reported similarly in succeeding examples.)

Carbon: 51.2 Wt. % (52.2); Hydrogen 7.5 (7.8); Nitrogen 11.6 (12.2).

X-ray diffraction revealed at least the following peaks: 4.4 (100), 2.4 (14), 3.1 (12), 4.1 Å (11).

Infrared analysis revealed at least the following peak: 1693 $cm^{-1}$

Differential scanning calorimetry analysis revealed melting endotherms at 59° C. and 53° C.

Example 2

TEDA-succinic Acid-$H_2O$

Succinic acid (5.9 g, 0.05 mole) and TEDA (5.6 g, 0.05 mole) were dissolved in 500 mL ethanol at 60° C. The clear solution was placed in a beaker and left to evaporate. After 3 days, only about 50 mL solvent remained. Filtration yielded 9.4 g (81%) white crystals that were washed twice with 5 mL of cold ethanol then air dried. After cooling to 4° C., the combined filtrate and washings deposited 1.3 g additional product.

Elemental analysis (experimentally found versus calculated for $C_{10}H_{20}N_2O_5$):

Carbon 48.3 (48.4); Hydrogen 7.7 (8.1); Nitrogen 9.8 (11.3).

X-ray diffraction revealed at least the following peaks: 3.9 (100), 5.0 (89), 4.3 (62), 5.6 (55), 3.8 Å (51).

Infrared analysis revealed at least the following peaks: 3561, 3476, 2480 (broad), 1690, 1642 $cm^{-1}$.

Thermal Gravimetric Analysis (TGA) revealed about a 6% weight loss by 126° C. This appeared to represent loss of approximately one water of hydration per adduct (the calculated weight loss which would be expected based on 1:1 TEDA/succinic acid adduct losing one water of hydration would be 7.3 wt. %).

Example 3

TEDA-tartaric Acid

TEDA (11.2 g, 0.1 mole) and tartaric acid (L-(+)-tartaric acid, 15.0 g, 0.1 mole, Merck Co., Rahway, N.J.) were combined with stirring in 50 mL warm water. Water was removed at 60° C. using a rotary evaporator. The residue was kept under dynamic vacuum at 60° C. for 24 hrs. There remained 25.6 g (98%) of product as white chunks.

Elemental analysis (experimentally found versus calculated for $C_{10}H_{18}N_2O_6$):

Carbon 45.9 (45.8); Hydrogen 7.0 (6.9); Nitrogen 10.8 (10.7).

X-ray diffraction revealed at least the following peaks: 4.9 (16), 4.5 (100), 2.4 Å (16).

Infrared analysis revealed at least the following peaks: 3423, 3340, 1649 $cm^{-1}$ Differential scanning calorimetry analysis revealed a melting endotherm at 66° C. (without recrystallization).

$^{15}N$ nuclear magnetic resonance (NMR) of the solid product revealed at least a peak at δ30 (ppm, with respect to liquid $NH_3$).

Example 4

TEDA-malonic Acid

Malonic acid (10.4 g, 0.1 mole) was added to a solution of 11.2 g (0.1 mole) TEDA in 50 mL ethanol. After stirring for 1 hr, the mixture was heated to boiling then cooled to room temperature. Filtration afforded 9.4 g (44%) product as white crystals.

Elemental analysis (experimentally found versus calculated for $C_9H_{16}N_2O_4$):

Carbon 49.9 (50.0); Hydrogen 7.1 (7.4); Nitrogen 12.7 (13.0).

X-ray diffraction revealed at least the following peaks: 6.2 (31), 5.5 (44), 4.8 (36), 4.6 (57), 3.9 (85), 3.6 (100), 2.5 Å (35).

Infrared analysis revealed at least the following peaks: 2350, 1702 $cm^{-1}$

Differential scanning calorimetry analysis revealed no observable melting endotherm.

Example 5

TEDA-citric Acid

Anhydrous citric acid (19.2 g, 0.1 mole, Biorad Corp., Richmond, Calif.) was added to a solution of TEDA (11.2 g, 0.1 mole) in 75 mL ethanol. The mixture was heated to boiling, cooled to room temperature then stirred for 14 hrs. Filtration afforded the product as white crystals, 29.0 g (96%) after vacuum drying.

Elemental analysis (experimentally found versus calculated for $C_{12}H_{20}N_2O_7$):

Carbon 46.5 (47.4); Hydrogen 6.5 (6.6); Nitrogen 9.1 (9.2).

X-ray diffraction revealed at least the following peaks: 5.0 (44), 4.9 (81), 4.9 (39), 4.7 (100), 4.0 Å (28).

Infrared analysis revealed at least the following peaks: 3408, 2470, 1958, 1730 $cm^{-1}$.

Example 6

TEDA-malic acid dl-Malic acid (13.4 g, 0.1 mole, Sigma Chemical Co., St. Louis, Mo.) was dissolved in 100 mL warm ethanol. With vigorous stirring, 11.2 g (0.1 mole) TEDA in 25 mL ethanol was added. The product separated as a thick white precipitate. It was isolated by filtration, sucked dry then dried under vacuum. The yield was 22.6 g (92%).

Elemental analysis (experimentally found versus calculated for $C_{10}H_8N_2O_5$):

Carbon 49.1 (48.8); Hydrogen 7.2 (7.3); Nitrogen 11.3 (11.4).

X-ray diffraction revealed at least the following peaks: 6.2 (31), 5.5 (44), 4.8 (36), 4.6 (57), 3.9 (55), 3.4 Å (100).

Infrared analysis revealed at least the following peaks: 3433, 2457, 1885, 1717 $cm^{-1}$.

Example 7

TEDA-glutamic Acid

TEDA (11.2 g, 0.1 mole) was added to a suspension of 14.7 g (0.1 mole) l-glutamic acid in 150 mL hot water. The resulting clear solution was taken to dryness on a rotary evaporator. The product was pulverized in a mortar then vacuum dried for 16 hrs at 60° C. The yield was 24.7 g (95%).

Elemental analysis (experimentally found versus calculated for $C_{11}H_{21}N_3O_4$):

Carbon 51.2 (51.0); Hydrogen 7.9 (8.1); Nitrogen 15.7 (16.2).

Infrared analysis revealed at least the following peaks: 3048, 2573, 2522, 2135, 1638, 1592 $cm^{-1}$.

Thermal Gravimetric Analysis showed a sharp (weight loss rate) peak at 170° C. (representing about 35% weight loss) followed by broad peaks at 220, 224 and 295° C. Substantial (6%) residue remained at 988° C. possibly indicative of gross decomposition of the sample rather than volatilization.

Thermogravimetric Testing Summary

Thermogravimetric test data for the adducts of Examples 1-7 (Example 2 excepting) are presented in Table 1. In these data, $T_{max}$ (adduct) is the measured $T_{max}$ (temperature of maximum rate of weight loss) of the adduct; $T_{max}$ (acid) is the measured $T_{max}$ of the carboxylic acid alone.

TABLE 1

$T_{max}$ Data for Adducts and Parent Polycarboxylic Acids

| Example | Carboxylic Acid | $T_{max}$ (adduct) (° C.) | $T_{max}$ (acid) (° C.) |
|---|---|---|---|
| 1 | Succinic | 144 | 182 |
| 3 | Tartaric | 206 | 211 |
| 4 | Malonic | 173 | 155 |
| 5 | Citric | 182 | 192 |
| 6 | Malic | 216 | 196 |
| 7 | Glutamic | 170 | 215 |

Cyanogen Chloride Service Life Test

A test system is used to subject various sorbent samples to cyanogen chloride challenges in order to assess their performance for removing cyanogen chloride from gaseous streams. High-pressure compressed air is reduced in pressure, regulated, and filtered by a regulator (3M Model W-2806 Air Filtration and Regulation Panel, 3M, St. Paul, Minn.) to remove particulates and oils. A valve (Hoke Inc., Spartanburg, S.C.) is used to set the desired main airflow rate as measured by a flow meter (Dwyer Instruments, Michigan City, Ind.) with a range of 0 to 200 SCFH. The flow meter is calibrated using a dry gas test meter (American Meter, model DTM-325).

The main airflow passes through the headspace above a heated distilled water bath and then into a 250 ml mixing flask. Relative humidity in the mixing flask is monitored using a RH sensor (Type 850-252, General Eastern, Wilmington, Mass.). The RH sensor provides an electrical signal to a humidity controller (a PID controller series CN1201AT from Omega Engineering, Stamford, Conn.) that delivers power to a submerged heater to maintain the RH at the set point. Unless otherwise indicated, the relative humidity is controlled at 92%.

High purity cyanogen chloride is prepared using the method described by H. Schröder in Z. anor. allg. Chem. 297, 296 (1958) and stored in a steel lecture bottle.

Sodium pyrophosphate at 5% of the cyanogen chloride weight is added as a stabilizer. The lecture bottle of cyanogen chloride provides a flow of cyanogen chloride vapor.

An Aalborg 150 mm PTFE-glass rotameter with flowtube 042-15-GL is used to measure cyanogen chloride volumetric flow. A stainless steel, fine metering valve (Whitey Co. SS21RS4, Highland Heights, Ohio) is used to set the desired cyanogen chloride flow rate.

The combined cyanogen chloride/air mixture at a concentration of 550 ppm cyanogen chloride and 92% RH flows at a flowrate at 32 L/min into a polycarbonate box equipped with 29/42 connections at the top and bottom. The test fixture containing the sorbent to be tested is mounted onto the bottom 29/42 fitting. (A drawing of a suitable fixture is shown in FIG. 2 of ASTM Standard Guide for Gas-Phase Adsorption Testing of Activated Carbon—D5160-95). A specified sorbent volume, typically 75 mL, is loaded into the 3.5 inch inner diameter aluminum test fixture. The fixture is loaded with sorbent using a snowstorm filling technique in which the sorbent falls into the test fixture through a loading column containing screens to evenly distribute the sorbent across the bed. Typical bed depth is approximately 1.2 cm (0.45 in).

To start the test, a steady 32 L/min flow of a cyanogen chloride/air mixture at 550 ppm and 92% RH is introduced into the polycarbonate box through the top 29/42 connection. Cyanogen chloride concentration exiting the sorbent bed is measured with a SRI 8610C gas chromatograph (SRI Instruments, Torrance, Calif.) equipped with a gas sampling valve and a hydrogen flame ionization detector. A vacuum source continuously draws approximately 50 mL/min of sample from the test outlet through the gas sampling valve of the GC. Periodically the valve injects a sample onto a 6 ft×⅛ inch column of 10% Carbowax 20M on Chromosorb W-HP 80/100 (Alltech part 12106PC, Alltech Associates, Deerfield, Ill.). Cyanogen chloride is separated from air and its concentration measured by a hydrogen flame ionization detector (minimum detectable cyanogen chloride concentration about 0.5 ppm). The GC is calibrated using cyanogen chloride in air mixtures prepared by injecting known volumes of cyanogen chloride vapor into a 39.2 L stainless steel tank filled with air. An internal fan circulates the mixture inside the tank. The vacuum source draws a sample of the mixture into the gas sampling valve of the GC for analysis. Calibration of the FID is typically linear over the entire range from 0.5 to 600 ppm cyanogen chloride.

A plot of ppm cyanogen chloride vs. time is generated and used to determine the Cyanogen Chloride Service Life (also known as the CK Service Life or CK Lifetime). In this test, the Cyanogen Chloride Service Life is defined as the time (from initial cyanogen chloride exposure) at which greater than 3 ppm cyanogen chloride is detected on the downstream side of the filter. This Service Life is recorded and can be used to compare the relative performance of the various samples.

Gold Catalyst Test

Catalyst poisoning tests are performed to determine the effect of various materials (e.g., TEDA/polycarboxylic acid adduct samples) on gold CO oxidation catalysts. In all cases, the gold catalyst that is used is prepared in similar manner to that described in US Patent Publication 2007/0207079, Example 3.

20 ml of sample (e.g., activated carbon containing various adducts, etc.) are poured into an 8 oz glass jar. A 20 ml vial containing 7 ml of the above-references gold catalyst is also placed, uncapped, within the 8 oz jar. The 8 oz jar is then capped and placed in a 71° C. oven for 7 days. After removal from the oven and cooling to room temperature, the 8 oz jar is opened, and the 20 ml vial containing the gold catalyst is removed and capped until catalyst performance testing is conducted.

Catalyst performance testing is conducted in similar manner to the procedure described in US Patent Publication 2005/0095189, Test Method #2. The catalyst is exposed to a gaseous stream with a carbon monoxide (CO) concentration of 3600 ppm and a flow rate of 9.6 lpm. The carbon monoxide concentration downstream from the catalyst is detected and a table of ppm (part per million) CO vs. time is generated. (In a slight difference from the test method of US Patent Publication 2005/0095189), the ppm of CO at a time of 23 minutes (from the initial CO exposure) is reported, and can be used to compare the relative performance of catalysts that have been exposed to various samples.

Comparative Example C1

A sample of gold catalyst was prepared in similar manner to that listed in US Patent Publication 2007/0207079, Example 3, and was aged according to the procedure outlined in the Gold Catalyst CO Value Test above, but without any exposure to TEDA or adduct.

The sample was found to exhibit a Gold Catalyst Test value of 128 ppm CO (measured at 23 minutes per the above procedure), as shown in Table 2.

Comparative Example C2

TEDA was coated on 12×20 Kuraray GG activated carbon (Kuraray Chemical Company, Osaka JP) by incipient wetness coating, in similar manner to that outlined in the following procedure: an aqueous mixture was provided that contained approximately 3% TEDA based on the carbon mass. Small incremental amounts of the mixture were added to approximately 50 g of GG carbon, until the incipient wetness point appeared to have been reached (by visual inspection). With the water to carbon ratio that corresponded to an incipient wetness condition thus determined, a selected amount of aqueous mixture was prepared, at a selected TEDA concentration, such that when the aqueous TEDA mixture was added to carbon at the incipient wetness ratio, a nominal TEDA loading on the carbon of 3 parts per hundred would result. The aqueous TEDA mixture was then added in small incremental amounts, with frequent stirring, to a batch of activated carbon until the targeted incipient wetness ratio was reached. The carbon was then allowed to soak for two hours with occasional mixing. The carbon was then spread in a single layer in a glass baking dish and dried for two hours at 105° C.

This sample was found to have a Cyanogen Chloride Service Life of 14 minutes and a Gold Catalyst Test value of 2216 ppm CO, as shown in Table 2.

Comparative Example C3

An activated carbon was prepared in similar manner to the methods described in U.S. Pat. No. 5,344,626, Example Six. The incipient wetness ratio was determined, and thereafter an aqueous mixture of TEDA was prepared and deposited onto the activated carbon by incipient wetness coating, in similar manner as that described above in Comparative Example 2.

A sample of this activated carbon with TEDA deposited thereon, when dried for two hours at 105° C., was found to have a Cyanogen Chloride Service Life of 18 minutes and a Gold Catalyst Test value of 3117 ppm CO. A sample when dried for six hours at 105° C. was found to have a Cyanogen Chloride Service Life of 29 minutes and a Gold Catalyst Test value of 1049 ppm CO.

Examples 8-11

TEDA/Polycarboxylic Acid Adducts on the Activated Carbon of Comparative Example C2

For Kuraray GG activated carbon, the weight ratio of water that corresponds to the incipient wetness point was determined. Aqueous mixtures of TEDA and a polycarboxylic acid were made by weighing and stirring the materials into water in amounts shown in Table 1 (in the "Mass Water", "Mass TEDA", and "Mass Acid" columns). The amount of TEDA added to each aqueous mixture was chosen so as to combine with the amount of mixture to result in a final deposited amount of TEDA of about 3 parts by weight TEDA per hundred parts of carbon. (For each sample, the specific calculated Final Weight % of TEDA deposited on the carbon, is presented in the "Final Wt. %" column of Table 2). The amount of polycarboxylic acid added to each aqueous mixture was chosen to as to provide a nominal 1:1 stoichiometric ratio of polycarboxylic acid to TEDA.

Each aqueous mixture was introduced into/onto the amount of GG carbon (12×20 size) listed in Table 2 ("Mass GG") via the incipient wetness technique, using the aqueous mixture/activated carbon weight ratio (determined as discussed above) for that that particular sample. The samples were dried for two hours at 105° C. The activated carbon with the TEDA/polycarboxylic acid adduct deposited thereupon, was then tested in the Cyanogen Chloride Service Life test and the Gold Catalyst Test, with the results shown in Table 3.

TABLE 2

TEDA/Polycarboxylic Acid Adduct on GG Carbon - Composition

| Example | Acid | Mass GG (g) | Mass Water (g) | Mass TEDA (g) | Mass Acid (g) | Final Wt. % TEDA |
|---|---|---|---|---|---|---|
| 8 | Succinic | 250.56 | 216.36 | 6.99 | 7.38 | 2.8 |
| 9 | Citric | 125.73 | 108.18 | 3.61 | 6.08 | 2.9 |
| 10 | Malonic | 126 | 109.09 | 3.46 | 3.42 | 2.8 |
| 11 | Glutamic | 125.97 | 108.81 | 3.49 | 4.56 | 2.8 |

TABLE 3

TEDA/Polycarboxylic Acid Adduct on GG Carbon - Performance

| Example | Adduct | CK Service Life (min) | Gold Catalyst Test (ppm CO @ 23 min) |
|---|---|---|---|
| Comparative-1 | None (gold catalyst only) | — | 128 |
| Comparative-2 | None (TEDA only) | 14 | 2216 |
| 8 | TEDA/Succinic | 25 | 105 |
| 9 | TEDA/Citric | 27 | 1104 |
| 10 | TEDA/Malonic | 15 | 410 |
| 11 | TEDA/Glutamic | 20 | 3093 |

Examples 12-15

TEDA/Polycarboxylic Acid Adduct on the Activated Carbon of Comparative Example C3

Activated carbon was prepared in similar manner to the methods described in U.S. Pat. No. 5,344,626, Example Six. The weight ratio of water that corresponded to the incipient wetness point was determined. Aqueous mixtures of TEDA and a polycarboxylic acid were made, deposited onto the carbon, and dried, in similar manner as described above for Examples 8-11. Again the TEDA amount was targeted to correspond to a final ratio of about 3 parts TEDA per 100 parts carbon, with the amount of polycarboxylic acid chosen so as to provide a nominal 1:1 stoichiometric ratio of polycarboxylic acid to TEDA. The activated carbon with the TEDA/polycarboxylic acid adduct deposited thereupon, was then tested in the Cyanogen Chloride Service Life test and the Gold Catalyst Test, with the results shown in Table 5.

TABLE 4

TEDA/Polycarboxylic Acid Adduct on the Activated Carbon of U.S. Pat. No. 5,344,626, Ex. 6 - Composition.

| Example | Acid | Mass GG (g) | Mass Water (g) | Mass TEDA (g) | Mass Acid (g) | Final Wt. % TEDA |
|---|---|---|---|---|---|---|
| 12 | Malonic | 250.53 | 206.24 | 6.63 | 6.09 | 2.6 |
| 13 | Succinic | 126.18 | 91.85 | 3.07 | 5.16 | 2.4 |
| 14 | Citric | 125.82 | 94.12 | 2.99 | 2.95 | 2.4 |
| 15 | Glutamic | 125.45 | 93.91 | 3.01 | 3.93 | 2.4 |

TABLE 5

TEDA/Polycarboxylic Acid Adduct on the Activated Carbon of U.S. Pat. No. 5,344,626, Ex. 6 - Performance.

| Example | Adduct | CK Service Life (min) | Gold Catalyst Test (ppm CO @ 23 min) |
|---|---|---|---|
| Comparative-1 | None (gold catalyst only) | — | 128 |
| Comparative-3 | None (TEDA only) | 18 | 3117 (dried 2 hours) |
|  |  | 29 | 1049 (dried 6 hours) |
| 12 | TEDA/Malonic | 48 | 200 |
| 13 | TEDA/Succinic | 75 | 167 |
| 14 | TEDA/Citric | 52 | 150 |
| 15 | TEDA/Glutamic | 38 | 119 |

Example 16

TEDA/Poly(Acylic Acid) on the Activated Carbon of Comparative Example C3

Activated carbon was prepared in similar manner to the methods described in U.S. Pat. No. 5,344,626, Example Six. In a 500 mL beaker with magnetic stirring, 12.59 grams of a 35 wt. % aqueous solution of poly(acrylic acid) of average $M_w$=250,000, was combined with 214.12 grams DI water. 6.90 grams of TEDA was added slowly and stirred until dissolved. 199.86 grams of the solution was poured over 250.53 grams of the activated carbon in a 1L beaker, stirred slightly, and allowed to sit for 16 hrs. The activated carbon was then dried for two hours at 105° C. The activated carbon with TEDA/poly(acrylic acid) deposited thereupon, was then tested in the Cyanogen Chloride Service Life test and the Gold Catalyst Test, with the results shown below in Table 7.

TABLE 6

TEDA/Poly(acrylic acid) on the Activated Carbon of U.S. Pat. No. 5,344,626, Ex. 6 - Composition.

| Example | Acid | Mass GG (g) | Mass Water (g) | Mass TEDA (g) | Mass Acid (g) | Final Wt. % TEDA |
|---|---|---|---|---|---|---|
| 16 | Poly(acrylic) | 250.53 | 214.12 | 6.90 | 4.41 | 2.8 |

TABLE 7

TEDA/Poly(acrylic acid) Adduct on the Activated Carbon
of U.S. Pat. No. 5,344,626, Ex. 6 - Performance.

| Example | Adduct | CK Service Life (min) | Gold Catalyst Test (ppm CO @ 23 min) |
|---|---|---|---|
| Comparative-1 | None (gold catalyst only) | — | 128 |
| Comparative-3 | None (TEDA only) | 18 | 3117 (dried 2 hours) |
| | | 29 | 1049 (dried 6 hours) |
| 16 | TEDA/Poly(acrylic acid) | 15 | 163 |

Porous Polymeric Electret Webs

Porous polymeric nonwoven webs were prepared by melt-blowing methods similar to those described in Wente, Van A., "Superfine Thermoplastic Fiber", Industrial and Engineering Chemistry, vol. 48. No. 8, 1956, pp 1342-1346. The webs were fluorinated by plasma treatment in an atmosphere containing $C_3F_8$, using methods similar to those described in US Patent Publication 2003/0134515. The webs were charged by impinging water on the web, using methods similar to those described in US Patent Publication 2003/0134515.

Electret Aging Tests

Porous polymeric electret web tests are performed to determine the effect of various materials (e.g., TEDA/polycarboxylic acid adduct samples) on the filtration properties of electret webs. 75 ml of sample (e.g., activated carbon containing various adducts, etc.) are poured into a 32 ounce glass jar. The jar is swirled to create a uniform layer. Four 5.25" (13.2 cm) discs of porous polymeric web are placed vertically against the walls of the jar. The 32 ounce jar is then capped and placed in a 71° C. oven for 7 days. After removal from the oven and cooling to room temperature, the jar is opened, and the test webs are removed and placed in a sealed jar until performance testing is conducted.

Dioctyl Phthalate Penetration Test

A dioctyl phthalate (DOP) aerosol challenge penetration test is performed using a Certitest Model 8130 Automated filter Test (available from TSI, Inc. of Shoreview, Minn.), using equipment and procedures similar to those described in the NIOSH Determination of Particulate Filter Penetration to Test Against Liquid Particulates for Negative Pressure Air Purifying Respirators Standard Test Procedure No. RCT-APR-0051, as set forth in 42CFR, Part 84, Subpart G, Section 84.63(a)(c)(d) and Subpart K, Section 84.181; Volume 60, No. 110, Jun. 8 1995. The DOP particles are generated at a nominal geometric mean diameter of approximately 185 nm. The particles are impinged on a sample of porous polymeric electret web (approximately 100 cm² exposed sample area) in an gaseous stream moving at a flowrate of approximately 42.5 liters per minute, for a period of approximately 25 seconds. No ionizer or aerosol neutralizer is operated during the test. The DOP % Penetration for a given sample is calculated based on the measured DOP concentrations in the gaseous stream upstream and downstream from the web sample (as measured by light scattering). Penetration is reported in %.

Comparative Example C4

A sample of porous polymeric electret web was prepared as described above, and was not exposed to 71° C. aging. The sample was found to exhibit a DOP penetration of 8.3%, as shown in Table 8.

Comparative Example C5

A sample of porous polymeric electret web was prepared as described above, and was aged at 71° C. according to the procedure outlined in the Electret Aging Test but without any TEDA or adduct being present. The sample was found to exhibit a DOP penetration of 18.1%, as shown in Table 8.

Comparative Example C6

An activated carbon was prepared in similar manner to the methods described in U.S. Pat. No. 5,344,626, Example Six. An aqueous mixture of TEDA was prepared and deposited onto the activated carbon by incipient wetness coating in similar manner as that described above in Comparative Example 3. In this example, the TEDA concentration in the aqueous mixture, and the amount of aqueous mixture, were chosen to as to provide a nominal loading of TEDA on the activated carbon of 1.5%. The sample of this activated carbon with TEDA deposited thereon was dried for 6 hours at 105° C.

A sample of porous polymeric electret web was prepared as described above, and was aged at 71° C. in the presence of the TEDA-loaded activated carbon according to the procedure outlined in the Electret Aging Test. The sample was found to exhibit a DOP penetration of 54.1%, as shown in Table 8.

Examples 17-19

Electret Webs Exposed to TEDA/Polycarboxylic Acid Adduct on the Activated Carbon of Comparative Example C2 or C3

Kuraray GG activated carbon was obtained; and, activated carbon was prepared in similar manner to the methods described in U.S. Pat. No. 5,344,626, Example Six. The weight ratio of water that corresponded to the incipient wetness point was determined as outlined above for Comparative Examples 2 and 3 respectively. Aqueous mixtures of TEDA and a polycarboxylic acid were made, deposited onto the carbon, and dried, in similar manner as described above. The TEDA concentration and the amount of aqueous TEDA mixture were chosen in various cases so as to combine to achieve a nominal TEDA loading on the activated carbon of either 1.5% or 3.0%, as noted below. The amount of polycarboxylic acid added to each aqueous TEDA mixture was chosen so as to provide a nominal 1:1 stoichiometric ratio of polycarboxylic acid to TEDA. Porous polymeric electret web samples were then subjected to 71° C. aging in the presence of the activated carbon bearing the adduct (with exceptions in the comparative examples as noted). The webs were then tested in the Dioctyl Phthalate Penetration Test, with the results as shown in Table 8.

TABLE 8

Electret Webs Exposed to TEDA/Polycarboxylic Acid Adducts
on Activated Carbons - Performance.

| Example | Web 71° C. Aging Condition | TEDA Loading | Polycarboxylic Acid | DOP Penetration (%) |
|---|---|---|---|---|
| Comparative-4 | None | None | None | 8.3 |
| Comparative-5 | Without TEDA | None | None | 18.1 |
| Comparative-6 | With TEDA | 1.5% | None | 54.1 |
| 17 | With Adduct | 1.5% | Succinic Acid | 21.2 |
| 18 | With Adduct | 3.0% | Succinic Acid | 23.0 |
| 19 | With Adduct | 3.0% | Citric Acid | 23.0 |

The tests and test results described above are intended solely to be illustrative, rather than predictive, and variations in the testing procedure can be expected to yield different results. The foregoing detailed description and examples have been given for clarity of understanding only. No unnecessary limitations are to be understood therefrom. In particular, headings and/or subheadings in this disclosure are provided for convenience of reading, and no unnecessarily limitations are to be understood therefrom.

The present invention has now been described with reference to several embodiments thereof. It will be apparent to those skilled in the art that changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. A 1:1 stoichiometric adduct of triethylenediamine and succinic acid, wherein the adduct exhibits an X-ray diffraction pattern of 4.4 (100), 2.4 (14), 3.1 (12), 4.1 Å (11).

2. The adduct of claim 1, wherein the adduct is provided on a support.

3. The adduct of claim 2, wherein the support comprises an activated carbon that comprises a first metal salt wherein the metal is in group 6-12 of the periodic table, and a second metal salt that comprises a metal carbonate salt wherein the metal is in group 1 of the periodic table.

4. The adduct of claim 2, wherein the support comprises a guest/host structure.

5. A filter medium comprising the support of claim 2.

6. The filter medium of claim 5, wherein the filter medium is in a respiratory protection device.

7. The filter medium of claim 5, wherein the filter medium comprises a porous polymeric web.

8. The filter medium of claim 7, wherein the porous polymeric web comprises an electret web.

9. The filter medium of claim 8, wherein the filter medium is in a respiratory protection device.

10. The filter medium of claim 5, wherein the filter medium is part of a filter system comprising a catalyst active for the oxidation of carbon monoxide.

11. The filter medium of claim 10, wherein the catalyst comprises gold clusters of size from about 0.5 nm to about 50 nm.

12. The filter medium of claim 11, wherein the filter system is in a respiratory protection device.

* * * * *

UNITED STATES PATENT AND TRADEMARK OFFICE
CERTIFICATE OF CORRECTION

PATENT NO.      : 7,902,115 B2
APPLICATION NO. : 12/388647
DATED           : March 8, 2011
INVENTOR(S)     : Duane D Fansler et al.

Page 1 of 1

It is certified that error appears in the above-identified patent and that said Letters Patent is hereby corrected as shown below:

<u>Column 22</u>
Line 39, delete "Acylic" and insert -- Acrylic --, therefor.

Signed and Sealed this
Eleventh Day of October, 2011

David J. Kappos
*Director of the United States Patent and Trademark Office*